US012597666B2

(12) United States Patent
Friedman et al.

(10) Patent No.: US 12,597,666 B2
(45) Date of Patent: Apr. 7, 2026

(54) NOSECONE TO BATTERY CONNECTION IN POWER TOOL

(71) Applicant: Black & Decker Inc., New Britain, CT (US)

(72) Inventors: Brian E. Friedman, Baltimore, MD (US); Michael P. Sikora, Blatimore, MD (US); Tyler J. Petrus, Baltimore, MD (US); Robert G. Kusmierski, York, PA (US); Christopher W. Shook, Bel Air, MD (US); Erik A. Ekstrom, York, PA (US); Alexandros T. Theos, Bel Air, MD (US); Daniel L. Krout, Abingdon, MD (US); Spencer J. Sheckells, Parkville, MD (US); Jacob N. Preston, Jarrettsville, MD (US)

(73) Assignee: BLACK & DECKER INC., New Britain, CT (US)

( * ) Notice: Subject to any disclaimer, the term of this patent is extended or adjusted under 35 U.S.C. 154(b) by 970 days.

(21) Appl. No.: 17/717,506

(22) Filed: Apr. 11, 2022

(65) Prior Publication Data

US 2022/0336904 A1 Oct. 20, 2022

Related U.S. Application Data

(60) Provisional application No. 63/176,487, filed on Apr. 19, 2021.

(51) Int. Cl.
*H01M 50/247* (2021.01)
*B25B 21/02* (2006.01)
*B25F 5/02* (2006.01)

(52) U.S. Cl.
CPC ............. *H01M 50/247* (2021.01); *B25F 5/02* (2013.01); *B25B 21/023* (2013.01); *H01M 2220/30* (2013.01)

(58) Field of Classification Search
CPC ................ B25F 5/02; B25F 3/00; B25G 1/12
See application file for complete search history.

(56) References Cited

U.S. PATENT DOCUMENTS 4,700,876 A 10/1987 Wingert
7,511,393 B2 3/2009 Mizutani
(Continued)

FOREIGN PATENT DOCUMENTS

DE 102012214074 A1 2/2014
DE 102004027822 B4 11/2017
(Continued)

OTHER PUBLICATIONS

EP EESR dated, Sep. 14, 2022 in corresponding EP application No. 22168481.4.

*Primary Examiner* — Daniel Jeremy Leeds
(74) *Attorney, Agent, or Firm* — Amir R. Rohani

(57) ABSTRACT

A power tool is provided an electric motor, a nosecone assembly having a metal body, a terminal block that couples to a removable battery pack, and an electronic power module that regulates supply of electric current from the battery pack to the motor. A discharge wire is coupled to the terminal block on a first end and to the metal body of the nosecone assembly on a second end to provide a discharge path from the nosecone directly to the battery pack bypassing the electronic power module.

14 Claims, 12 Drawing Sheets

(56)                 References Cited

U.S. PATENT DOCUMENTS

| | | | |
|---|---|---|---|
| 7,605,506 B2 | 10/2009 | Kanda et al. | |
| 7,770,660 B2 | 8/2010 | Schroeder et al. | |
| 7,799,448 B2 | 9/2010 | Cruise et al. | |
| 8,333,252 B2 | 12/2012 | Britz et al. | |
| 8,339,000 B2 | 12/2012 | Bradfield | |
| 8,383,263 B2 | 2/2013 | Cruise et al. | |
| 9,266,702 B2 | 2/2016 | Fretz et al. | |
| 9,604,826 B2 | 3/2017 | Fretz | |
| 10,112,808 B2 | 10/2018 | Fretz et al. | |
| 10,273,127 B2 | 4/2019 | Fretz | |
| 10,370,227 B2 | 8/2019 | Fretz et al. | |
| 10,618,783 B2 | 4/2020 | Fretz et al. | |
| 2009/0126964 A1* | 5/2009 | Schroeder | H02K 11/28 |
| | | | 173/171 |
| 2018/0342928 A1* | 11/2018 | Ekstrom | B25F 5/008 |
| 2020/0195076 A1* | 6/2020 | Naito | H02K 3/12 |
| 2021/0083556 A1 | 3/2021 | Heimrich | |
| 2022/0085698 A1* | 3/2022 | Niwa | H02P 29/60 |

FOREIGN PATENT DOCUMENTS

| | | | |
|---|---|---|---|
| DE | 102019109403 A1 | 1/2019 | |
| DE | 102014013228 B4 | 12/2019 | |
| EP | 2009718 A2 | 12/2008 | |
| EP | 1017149 B1 | 9/2011 | |
| EP | 2439834 A2 | 4/2012 | |
| EP | 1422984 B1 | 1/2015 | |
| EP | 3616849 A1 | 3/2020 | |
| WO | 2012135283 A2 | 10/2012 | |
| WO | 2016138961 A1 | 9/2016 | |

* cited by examiner

NOSECONE TO BATTERY CONNECTION IN POWER TOOL

RELATED APPLICATION

This patent application claims the benefit of U.S. Provisional Application No. 63/176,487, filed Apr. 19, 2021, which is incorporated herein by reference in its entirety.

FIELD OF THE DISCLOSURE

This disclosure relates to a power tool, particularly, to an electrostatic discharge path between a terminal of a removable battery of the power tool to a nosecone.

BACKGROUND

Many power tools include a nosecone assembly that houses the transmission components of the power tool. In high impact and high torque applications, the nosecone assembly is often made of metal to protect the structural integrity of the components. In a high voltage environment, the nosecone may come into contact with a live electric power line, causing high current to pass from the nosecone, through the rotor and the stator windings, to the electronic components of the power tool and the battery pack. This high level of current can cause significant damage to the electronic components. Similarly, electrostatic discharge may build up in the power tool components as a result of being present in high voltage environments, finding a current path through the electronic components of the power tool to the tool battery pack. What is needed is a mechanism to protect the electronic components of the power tool from high voltage or electrostatic discharge of the nosecone.

BRIEF DESCRIPTION OF THE DRAWINGS

In the accompanying drawings which form part of the specification.

Corresponding reference numerals indicate corresponding parts throughout the several figures of the drawings.

SUMMARY

Figure 1:
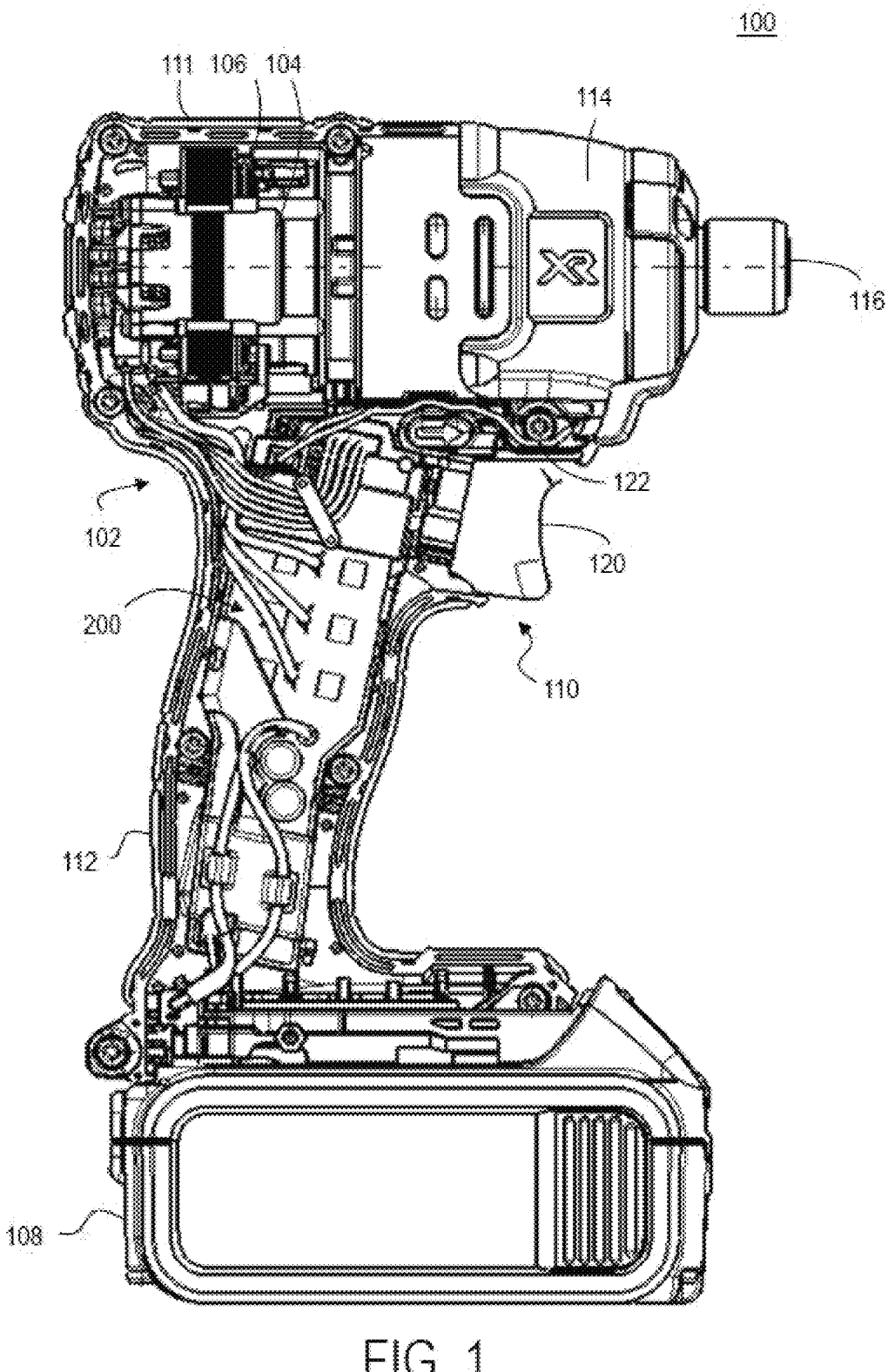
FIG. 1 depicts a side view of a power tool with a housing half of the tool removed to show its internal components, according to an embodiment.

In an embodiment, a power tool is provided including: a housing including a motor housing and a handle; an electric motor disposed inside the motor housing; a nosecone assembly mounted on the motor housing and including at least one transmission component driven by the electric motor, wherein the nosecone assembly includes a metal body; and a terminal block disposed at a foot of the handle and configured to be coupled to a removable battery pack, where the terminal block includes at least a power terminal configured to mate with a corresponding power terminal of the battery pack to receive a supply of electric current. The power tool further includes an electronic power module configured to regulate the supply of electric current from the battery pack to the motor; and a discharge wire coupled to the power terminal of the terminal block on a first end thereof and to the metal body of the nosecone assembly on a second end thereof to provide a discharge path from the nosecone directly to the battery pack bypassing the electronic power module. In an embodiment, this arrangement protects the electronic power module from electrostatic discharge or other high voltage discharge through the nosecone.

In an embodiment, the electronic power module includes a module housing having a bottom surface, a circuit board disposed within the module housing parallel to the bottom surface, and power switches mounted on a circuit board. In an embodiment, the discharge wire extends along the module housing.

In an embodiment, the electronic power module includes at least one wire holder configured to retain the discharge wire on the bottom surface.

In an embodiment, the power terminal of the terminal block includes a negative terminal and a positive terminal, and the discharge wire is coupled to the negative terminal.

In an embodiment, a connection tab is provided including a first portion coupled to the second end of the discharge wire and a second portion coupled to the metal body of the nosecone assembly.

In an embodiment, the first portion of the connection tab extends substantially along an axis of the motor, and the second portion of the connection tab extends substantially perpendicularly to the first portion.

In an embodiment, the second portion of the connection tab is configured to be received within a gap between the electric motor and the nosecone assembly and is secured to a radial portion of the metal body of the nosecone assembly.

In an embodiment, the second portion of the connection tab is provided with a planar body having a non-circular outer periphery and a through-hole. In an embodiment, the metal body of the nosecone assembly includes a recessed portion shaped to non-rotatably receive the planar body of the second portion of the connection tab and having a threaded opening therein. In an embodiment, a fastener is received through the through-hole and fastened into the threaded opening.

In an embodiment, a hook terminal is provided including a wire receptacle coupled to the second end of the discharge wire and a hook portion coupled to a protrusion of the metal body of the nosecone assembly.

In an embodiment, the protrusion includes a main portion having a rectangular cross-section sized to be received within the hook portion of the hook terminal.

In an embodiment, the protrusion further includes a lower portion having a larger cross-sectional area than the main portion that engages a lower edge of the hook portion to keep it in engagement with the main portion.

In an embodiment, a ring terminal is provided including a wire receptacle coupled to the second end of the discharge wire and a loop portion configured to receive a fastener therein for coupling a corresponding threaded opening formed in the metal body of the nosecone assembly.

In an embodiment, the nosecone assembly includes at least one side protrusion extending radially between respective recessed portions, the at least one side protrusion including a radial opening formed through an outer surface thereof and a lateral opening formed through a side surface thereof and intersecting the radial opening. In an embodiment, the second end of the discharge wire is received into one of the radial opening or the lateral opening, and a fastener is received through the other of the radial opening or the lateral opening to secure the second end of the discharge wire to the at least one side protrusion of the nosecone assembly.

In an embodiment of the invention, a power tool is provided including: a housing; an electric motor disposed within the housing; and a nosecone assembly mounted on the housing and including at least one transmission component driven by the electric motor. The nosecone assembly includes a metal body having at least one side protrusion extending radially between respective recessed portions. The side protrusion includes a radial opening formed through an outer surface thereof and a lateral opening formed through a side surface thereof and intersecting the radial opening. The power tool further includes a terminal block configured to be coupled to a removable battery pack, where the terminal block includes at least a power terminal configured to mate with a corresponding power terminal of the battery pack to receive a supply of electric current. The power tool further includes an electronic power module configured to regulate the supply of electric current from the battery pack to the motor; and a discharge wire coupled to the power terminal of the terminal block on a first end thereof and to the metal body of the nosecone assembly on a second end thereof to provide a discharge path from the nosecone directly to the battery pack bypassing the electronic power module. In an embodiment, the second end of the discharge wire is received into one of the radial opening or the lateral opening, and a fastener is received through the other of the radial opening or the lateral opening to secure the second end of the discharge wire to the at least one side protrusion of the nosecone assembly.

In an embodiment, the second end of the discharge wire is received into the radial opening and the fastener is received through the lateral opening.

DETAILED DESCRIPTION

With reference to the FIG. 1, a power tool 100 constructed in accordance with the teachings of the present disclosure is illustrated in a longitudinal cross-section view. Power tool 100 in the particular example provided may be a handheld impact driver, but it will be appreciated that the teachings of this disclosure is merely exemplary and the power tool of this invention could be any power tool. The power tool shown in FIG. 1 may include a housing 102, an electric motor 104, a battery pack 108, a transmission assembly (gear case or nosecone) 114, and an output spindle 116. The nosecone 114 may be removably coupled to the housing 102. The housing 102 can define a motor housing 111 and a handle 112.

According to an embodiment, motor 104 is received in motor housing 111. Motor 104 maybe be any type of motor and may be powered by an appropriate power source (electricity, pneumatic power, hydraulic power). In an embodiment, the motor is a brushless DC electric motor and is powered by a battery pack 108.

According to an embodiment of the invention, power tool 100 further includes an integrated electronic switch and control module 200 (hereinafter referred to as "electronic control module", or "control module"). Electronic control module 200, in an embodiment, may include a controller and electronic switching components for regulating the supply of power from the battery pack 108 to motor 105. In an embodiment, electronic control module 200 is disposed within the handle 112 below the motor housing 111, though it must be understood that depend on the power tool shape and specifications, electronic control module 200 may be disposed at any location within the power tool. Electronic control module may also integrally include components to support a user-actuated input unit 110 (hereinafter referred to as "input unit" 110) for receiving user functions, such as an on/off signal, variable-speed signal, and forward-reverse signal. In an embodiment, input unit 100 may include a variable-speed trigger 120 coupled to a plunger 232, although other input mechanism such as a touch-sensor, a capacitive-sensor, a speed dial, etc. may also be utilized. In an embodiment, an on/off signal is generated upon initial actuation of the variable-speed trigger 120. In an embodiment, a forward/reverse button 122 is additionally provided on the tool 100. The forward/reverse button 122 may be pressed on either side of the tool in a forward, locked, or reverse position. In an embodiment, the associated circuitry and components of the input unit 110 that support the variable-speed trigger 120 and the forward/reverse button 122 may be fully or at least partially integrated into the electronic control module 200. Based on the input signals from the input unit 110 and associated components, the controller and electronic switching components of the electronic control module 200 modulate and regulate the supply of power from the battery pack 108 to motor 105. Details of the electronic control module 200 are discussed later in detail.

While in this embodiment, the power source is battery pack 108, it is envisioned that the teachings of this disclosures may be applied to a power tool with an AC power source. Such a power tool may include, for example, a rectifier circuit coupled to the AC power source.

It must be understood that, while FIG. 1 illustrates a power tool impact driver having a brushless motor, the teachings of this disclosure may be used in any power tool, including, but not limited to, drills, saws, nailers, fasteners, impact wrenches, grinders, sanders, cutters, etc. Also, teachings of this disclosure may be used in any other type of tool or product that include a rotary electric motor, including, but not limited to, mowers, string trimmers, vacuums, blowers, sweepers, edgers, etc.

Figure 2A:
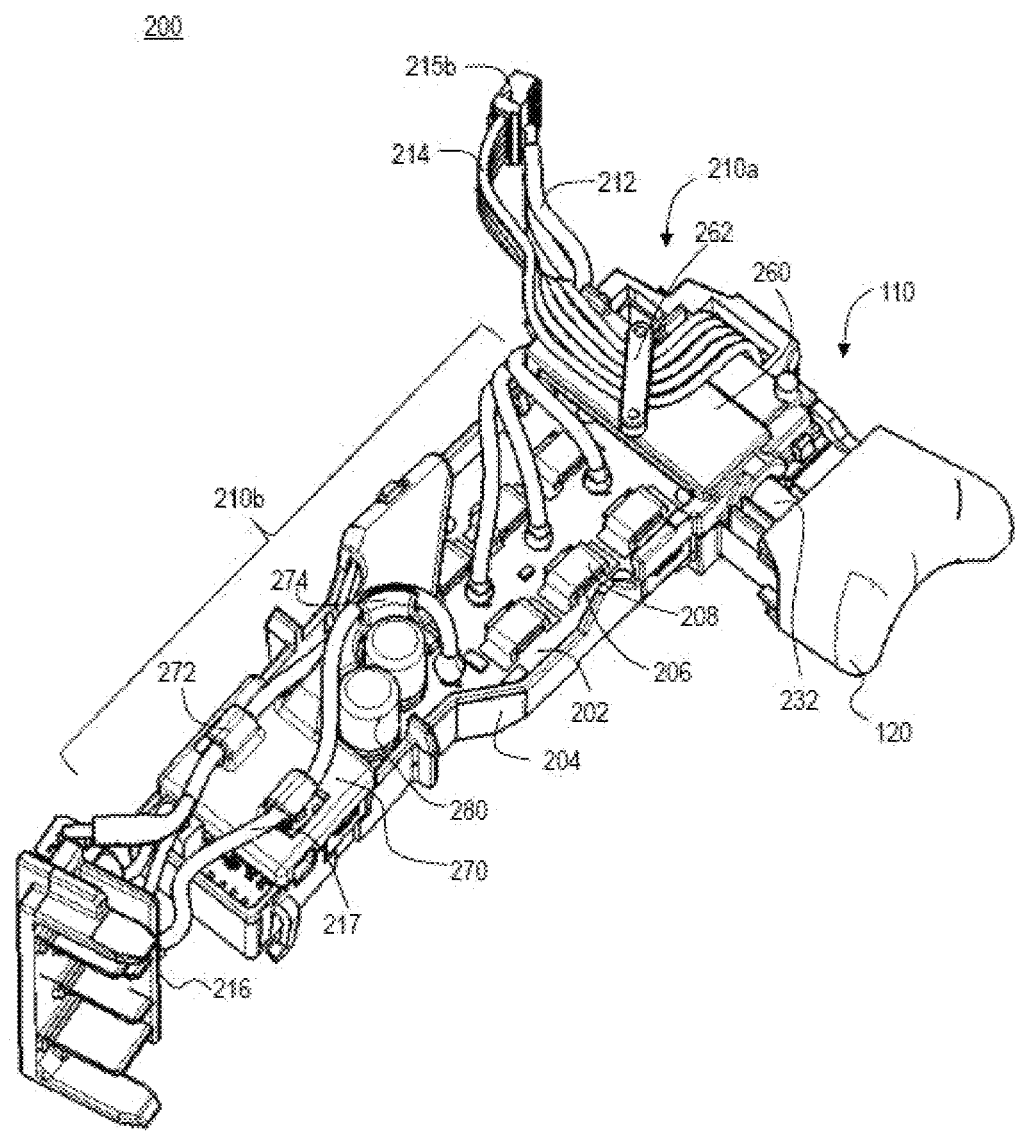
FIGS. 2A and 2B depict two perspective views of an electronic control module housed within the power tool, according to an embodiment.
Figure 2B:
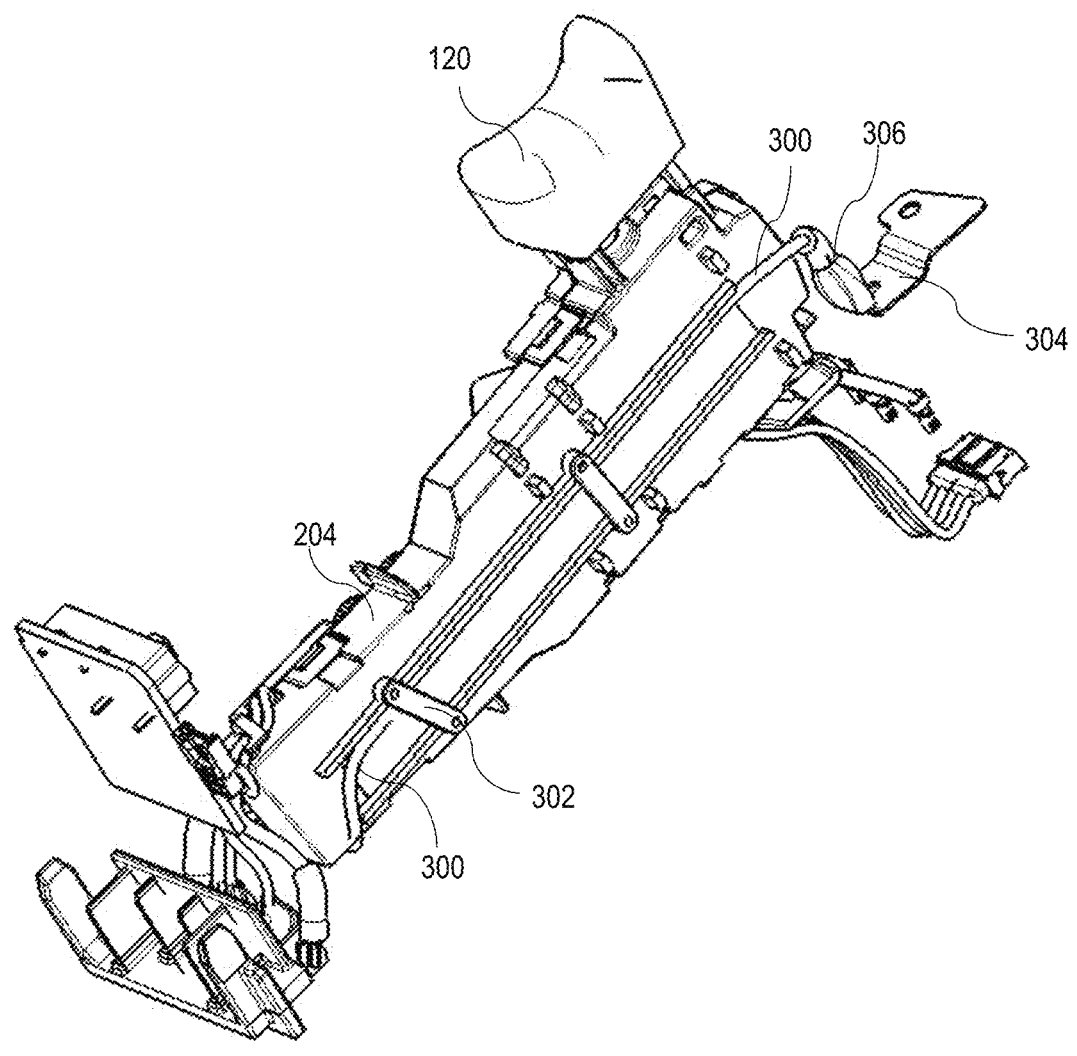

The electronic control module 200 is described herein, according to an embodiment of the invention. FIGS. 2A and 2B depict perspective views of electronic control module 200 from two different angles, according to an embodiment.

Electronic control module 200, in an embodiment, includes a printed circuit board (PCB) 202 arranged and mounted inside a module housing 204. Module housing 204 includes a bottom surface 227, side walls 228, and an open face. PCB 202 is inserted through the open face and secured inside the module housing 204. Control module 200 includes two compartments—an enclosed compartment 210a including an encapsulation member 260 that houses and encloses a first part of the PCB 202 and components associated with the input unit 110, and an open compartment 210b. Within the open compartment 210b, module housing 204 encloses the lower surface and the sides of PCB 202, but leaves the upper surface of the PCB 202 substantially exposed. Mounted on the upper surface of PCB 202 are a series of power switches 206 and a series of heat sinks disposed over the power switches 206 and secured to the PCB 202.

According to an embodiment, electronic control module 200 includes a controller (not shown) mounted to a lower surface of the PCB 202 and be in electronic communication with the rest of the PCB 202 components through vias (not shown). In an embodiment, controller may be a programmable micro-controller, micro-processor, or other processing unit capable of controlling the motor and various aspects of power tool. For example, controller may be programmed to turn on and off power switches 206 to control commutation of the brushless motor. In an embodiment, controller 218 may be coupled to a series of gate drivers disposed on the PCB 202, which in turn are connected to the gates of the power switches 206.

In an exemplary embodiment, power switches 206 may be Field Effect Transistors (FETs). In an embodiment, six power switches 206, including three high-side power switches and three low-side power switches, are arranged and coupled together as a three-phase bridge rectifier circuit. Using the gate drivers, controller 218 sequentially turns the power switches 206 on and off within each phase of the brush motor 104 commutation.

In an embodiment, the PCB 202 is further potted with a layer of potting compound (not shown) in the open compartment 210*b*. The layer of potting compound, in an embodiment, substantially covers most of the circuit components on the PCB, but it leave a top plate of heat sinks 208 exposed so the heat sinks 208 can dissipate heat away from the power switches 206. While the potting compound is not shown in FIGS. 2A-3B, the control module of FIG. 1 is shows with the potting compound disposed inside the housing 202.

In an embodiment, output wires 212 are coupled to the electronic control module 200. These output wires 212 connect the outputs of the power switches three-phase bridge rectifier to the power terminals the brushless motor 104. In an embodiment, a series of control signal wires 214 are also coupled to the electronic control module 200. These signal wires 214 are the control wires that, for example, provide position signals from Hall sensors (not shown) to the controller. A terminal connector 215*b* is coupled to an end of the control signal sires 214. In an embodiment, encapsulation member 260 includes wire retaining features 262 and wire guide features 264 for retaining and signal wires 214 and/or power output wires 212 away from the housing 204.

In an embodiment, a pair of power input wires 217 are also secured on the surface of PCB 202. These wires are coupled to a power source (e.g., battery 108) via a terminal block 216 to supply power from battery pack 108 to the power switches 206. Additionally, in an embodiment, the electronic control module 200 includes an additional cover 270. Cover 270 also includes wire retaining features 272 for retaining the power wires 217, as well as wire guide features 274 for guiding the wires 217 around circuit components (e.g., capacitors 280) mounted on PCB 202.

During operation, electrostatic discharge may build up in the power tool 100. Often, the electrostatic discharge finds a current path through the electronic control module 200 to the battery pack 108, causing damage to the power switches 206 and/or other electronic components of the module 200 in the process. Additionally, in a high voltage environment, whether making direct contact to live power lines or working near energized lines, the direct high voltage and/or strong electric field can couple to the tool and damage sensitive electronic components.

To dissipate the electrostatic discharge or high voltage coupling without damage to the electronic control module 200 components, a direct current path is provided between one of the terminals of the battery pack 108 (e.g., the B-terminal) and the nosecone 114. As shown in FIG. 2B, a discharge wire 300 coupled to the B-terminal of the power terminal 216, and therefore the B-terminal of the battery pack 108, is passed along the rear side of the module housing 204. The rear of the housing 204 may be provided with a wire holder 302 to secure the discharge wire 300.

According to a first embodiment, an end of the discharge wire 300 is connected to a connection tab 304 arranged to be fastened to the nosecone 114. The end of the discharge wire 300 is connected to the connection tab 304 via, e.g., soldering, welding, gluing, etc., according A sleeve 306 may be provided to cover the connection of the discharge wire 300 to the connection tab 304.

Figure 3A:
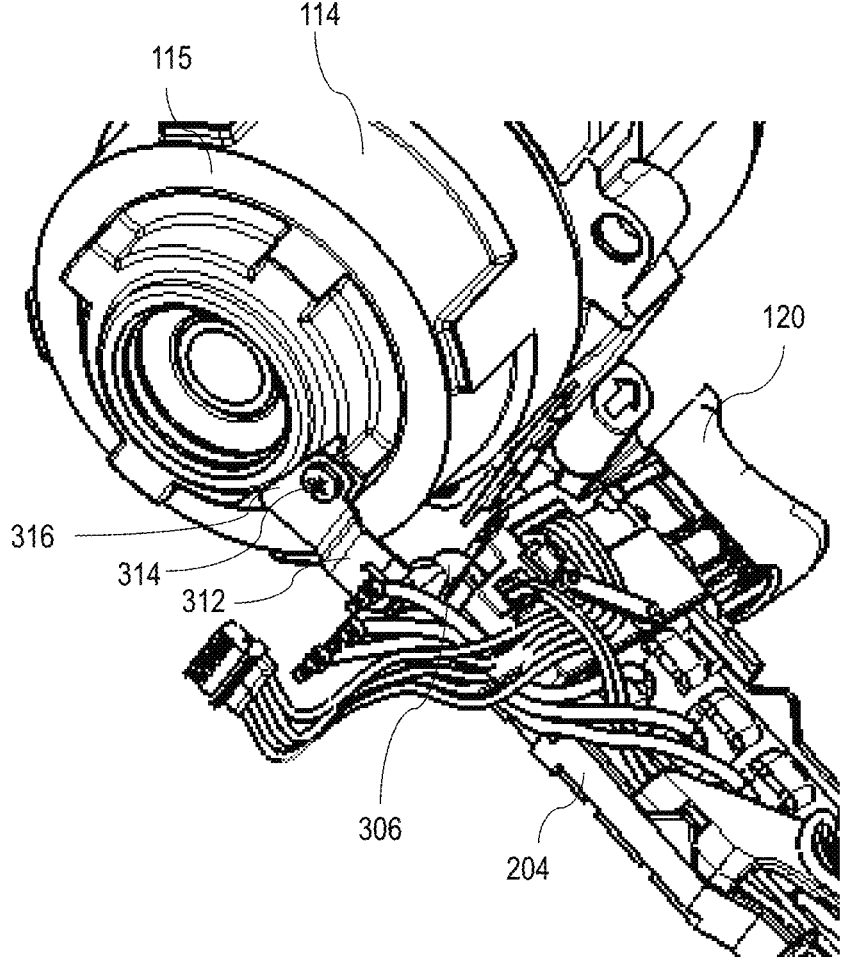
FIGS. 3A and 3B depict perspective and side views of a connection tab that connects the battery pack to a rear surface of the nosecone, according to an embodiment.
Figure 3B:
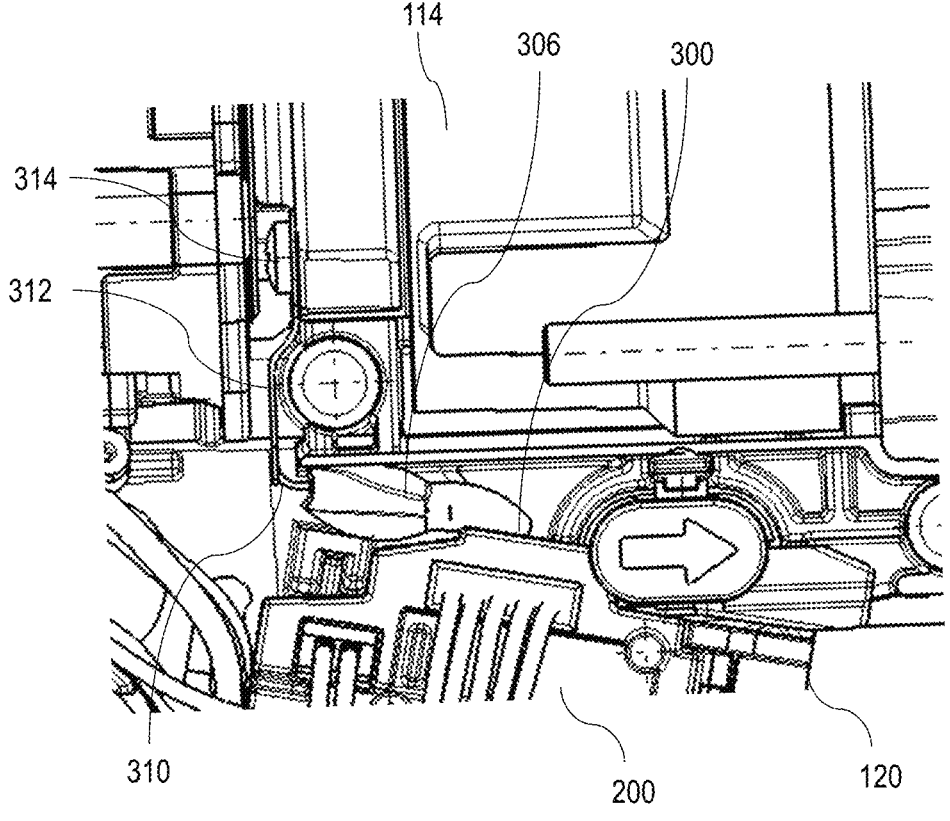

Referring to FIGS. 3A and 3B, the connection tab 304 includes a first portion 310 that is connected to the discharge wire 300 and is located substantially within the sleeve 306, and a second portion 312 that extends substantially perpendicularly from the first portion 310. In an embodiment, the first portion 310 extends along the top of the module housing 204, e.g., substantially parallel to the movement axis of the plunger 232. In an embodiment, the second portion 312 extends along a radial plane perpendicularly to a longitudinal axis of the motor 104. The second portion 312 is designed to be received within a gap between the motor 104 and the nosecone 114 and be fastened to the nosecone 114. In an embodiment, a threaded hole is provided on a rear radial surface 115 of the nosecone 114 and receives a fastener 413 to secure the second portion 312 to the nosecone 114. In an embodiment, a main body 316 of the second portion 312 is provided with a non-circular (in this example, quadrilateral) body that is received into a similarly-shaped recess portion around the threaded hole of the nosecone 114 to prevent the connection tab 304 from rotating along with the fastener 314.

Figure 4A:
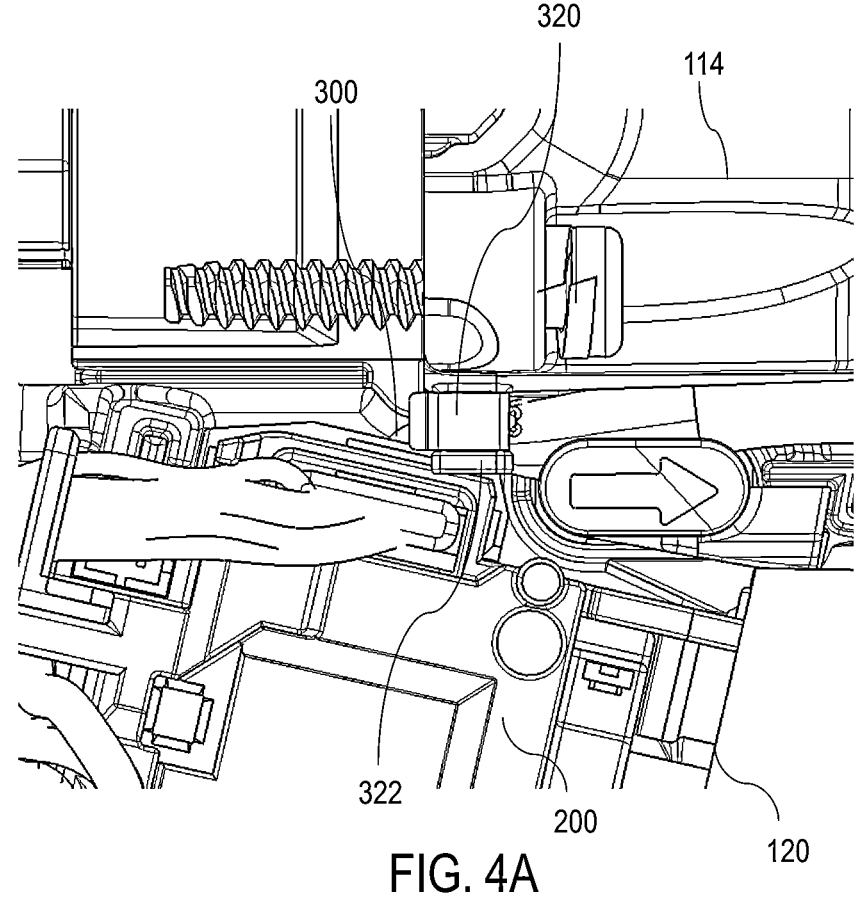
FIGS. 4A-4C depict side and perspective views of a hook terminal arranged to connect the battery pack to a protrusion of the nosecone, according to an embodiment.
Figure 4B:
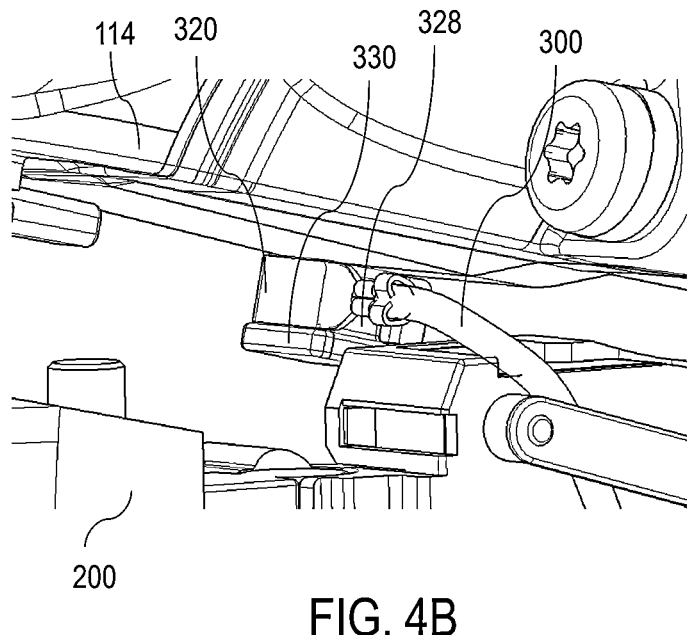
Figure 4C:
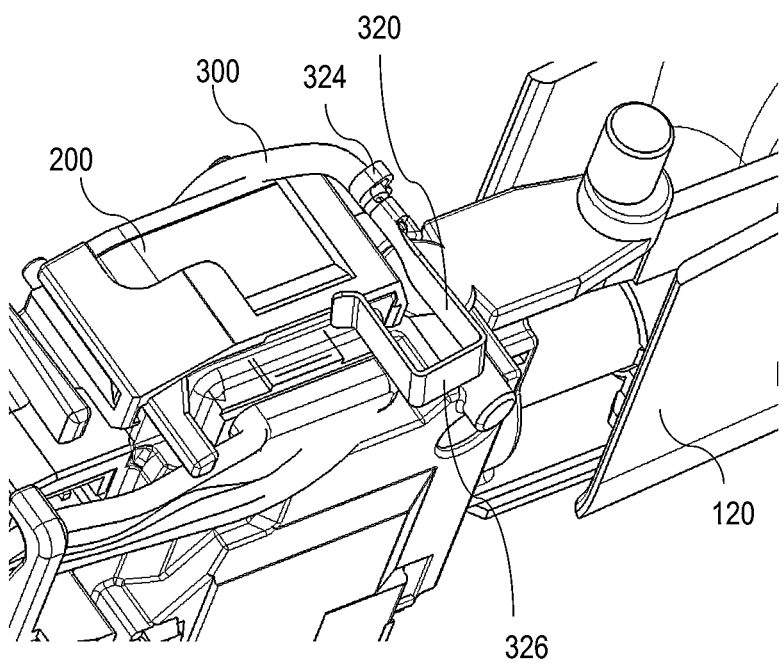

Referring to FIGS. 4A through 4C, the end of the discharge wire 300 is connected to a hook terminal 320 arranged to be secured to a protrusion 322 of the nosecone 144, according to a second embodiment. In an embodiment, hook terminal 320 includes a wire receptacle 324 that securely receives the end of the discharge wire 300, and a hook portion 326. Protrusion 322 of the nosecone 144 is preferably integrally formed as a part of the nosecone 144 housing and is provided at a lower side of the nosecone 144 in the direction of the electronic module 200. The protrusion 322 includes a main portion 328 having a rectangular cross-section sized to be snap-fit or press-fit into the hook portion 326 of the hook terminal 320, and a lower portion 330 having a larger cross-section than the main portion 328 that engages the lower edge of the hook portion 326. This arrangement allows the hook terminal 320 to be snap-fit or press-fit onto the protrusion 322 of the nosecone 144 during the assembly process, without a need for additional fastening. A rib in the cover half housing mold then presses against the outward surface of terminal 320 to ensure good electrical and mechanical contact of terminal 320 and protrusion 322.

Figure 5A:
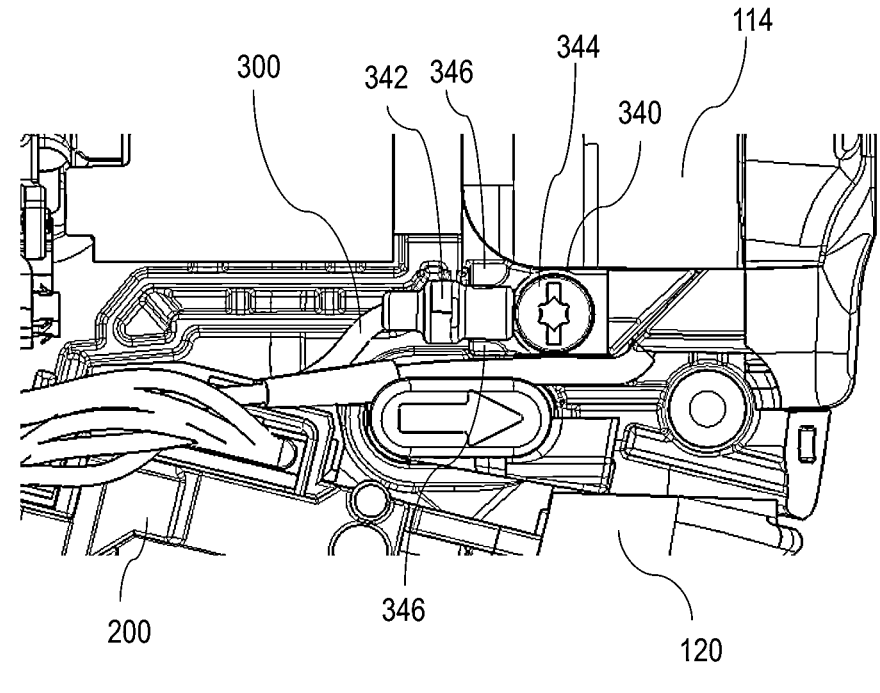
FIGS. 5A-5C depict side and perspective views of a ring terminal arranged to connect the battery pack to a threaded opening of the nosecone, according to an embodiment.
Figure 5B:
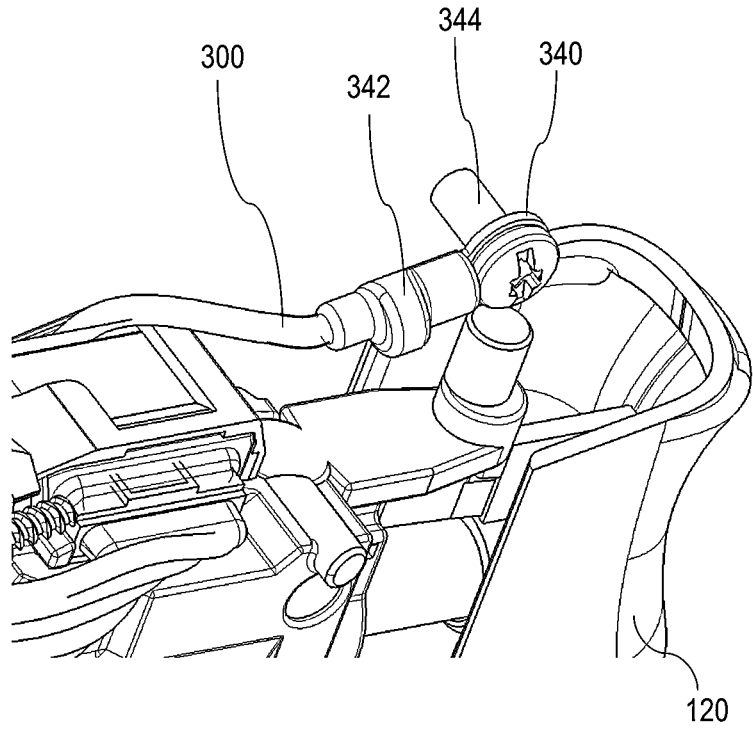
Figure 5C:
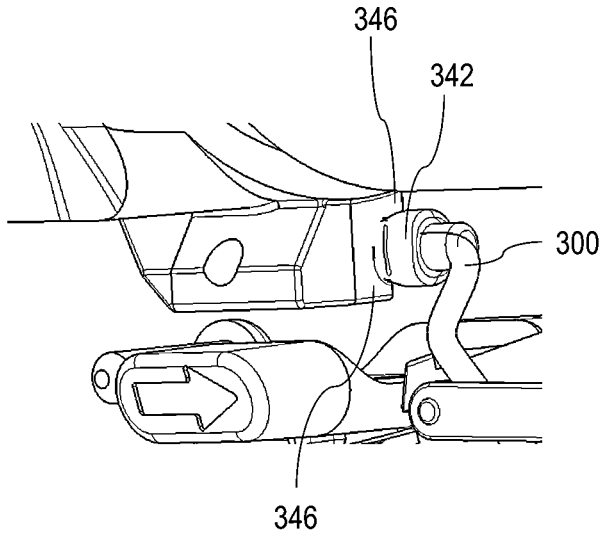

Referring to FIGS. 5A through 5C, the end of the discharge wire 300 is connected to a ring terminal 340 arranged to be received within a trapped threaded opening of the nosecone 144, according to a third embodiment. In an embodiment, ring terminal 340 includes a wire receptacle 342 that is securely coupled to the end of the discharge wire

300. The ring terminal 340 includes a through-hole through which a fastener 344 is received into the threaded opening of the nosecone 144. The nosecone 144 includes two protrusions 346 proximate the threaded opening forming a channel therebetween. The channel is sized to receive the wire receptacle 342 of the ring terminal 340. The channel traps and the wire receptacle 342 and prevents the ring terminal 340 from rotating as the fastener 344 is fastened into the threaded opening of the nosecone 144.

Figure 6A:
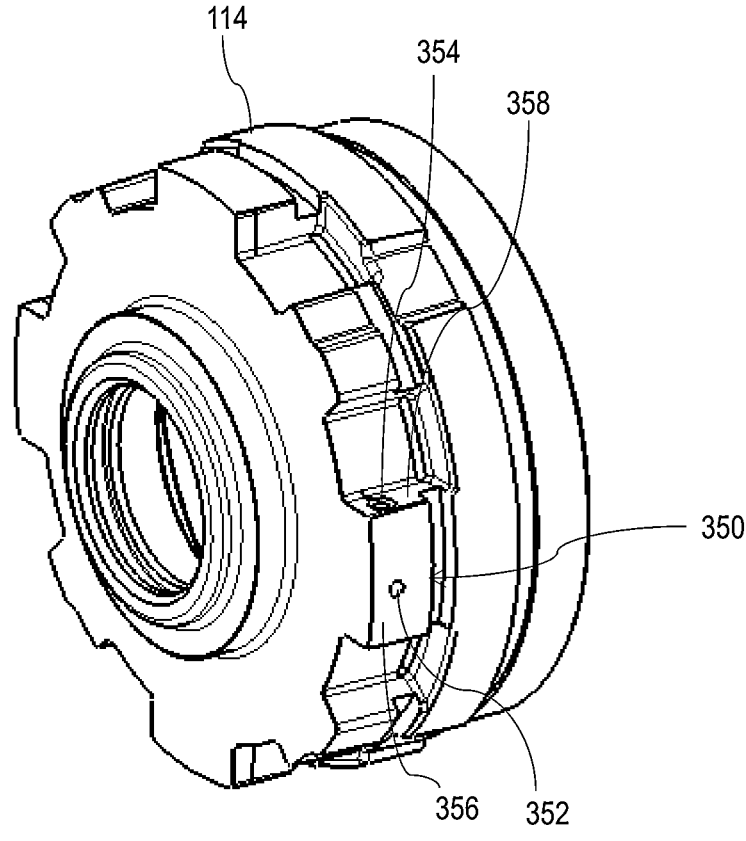
FIGS. 6A-6C depict side and perspective views of an end of a wire from the battery pack received into an opening of the nosecone, according to an embodiment.
Figure 6B:
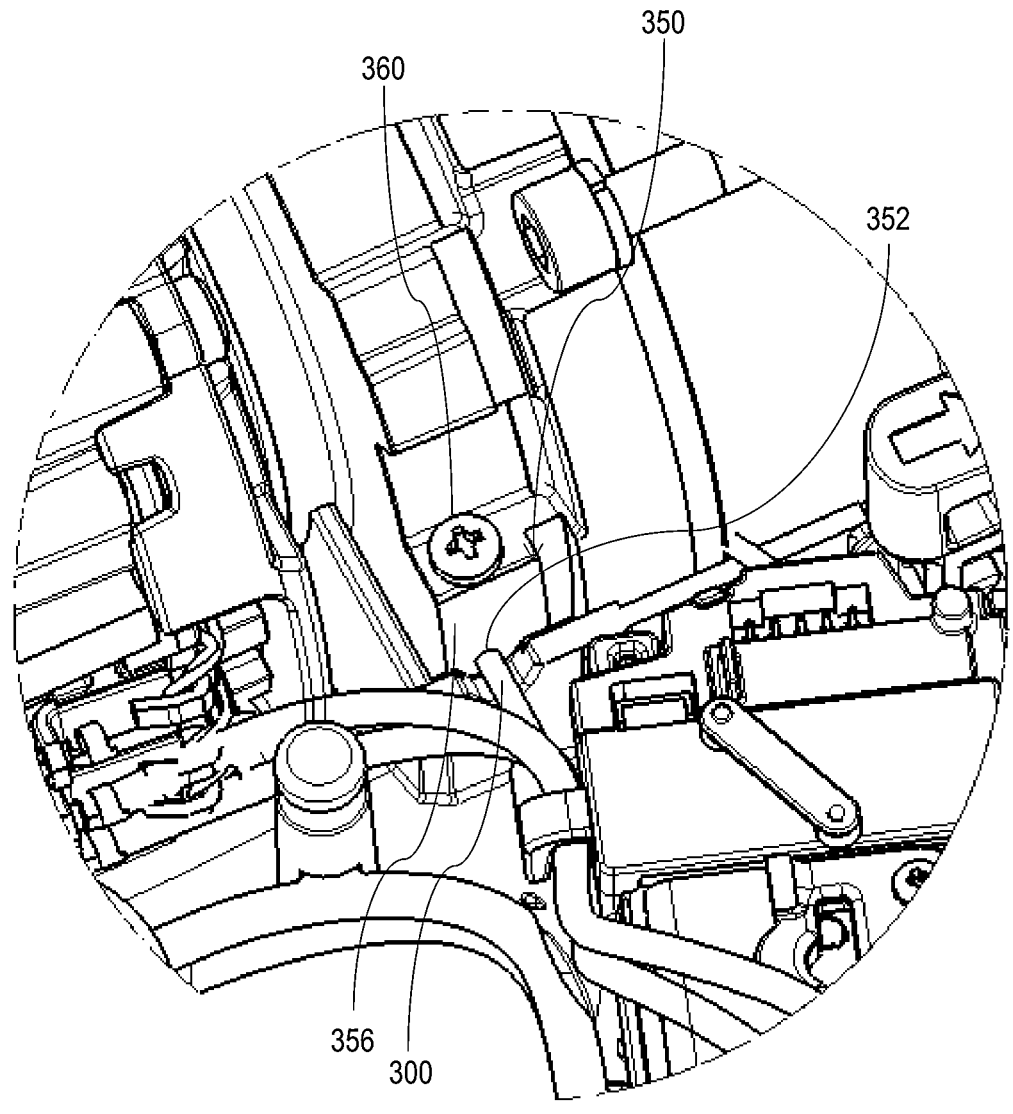
Figure 6C:
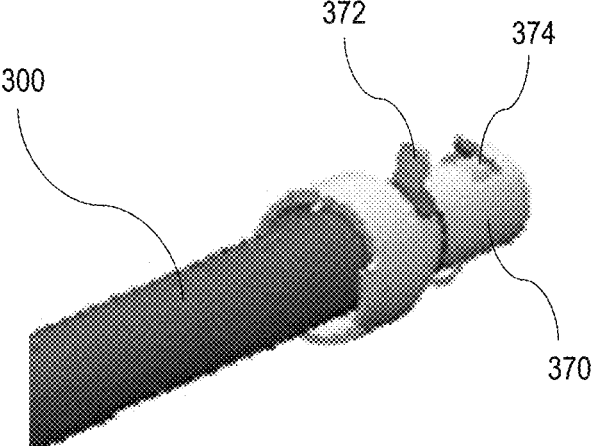

Referring to FIGS. 6A though 6C, the end of the discharge wire 300 is connected directly to the nosecone 144, according to a fourth embodiment. In an embodiment, nosecone 144 includes one or more side protrusions 350, which may be provided for securing the nosecone 144 to the tool housing. One of the side protrusions 350, preferably the one closest to the electronic module 200, is provided with two opening 352 and 354 drilled into the side protrusion 350 at an approximately 90 degree angle. In an embodiment, opening 352 is provided through a circumferential surface of the side protrusion 350 in the radial direction of the nosecone 144. In an embodiment, opening 354 is threaded and provided through a radial surface of the side protrusion 350 at approximately a right angle to opening 352, where ends of the two opening 252 and 24 meet inside the side protrusion 350. In an embodiment, the end of the discharge wire 300 is stripped and inserted into opening 352 along the radial direction of the nosecone 144.

In an embodiment, the end of discharge wire 300 may be terminated with a receptacle 370 that includes one or more radial tabs 372 to positioned to limit the insertion distance of the receptacle 370 into the hole 352, and a recess 374. Once the discharge wire 300 is inserted, a fastener 360 is fastened through opening 354 until it is depressed into the recess 374 of the receptacle 370 and secures the end of the discharge wire 300. In this manner, the discharge wire 300 is fastened directly to the nosecone 144 in a secure and easy to assemble manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   a housing including a motor housing and a handle;
   an electric motor disposed inside the motor housing;
   a nosecone assembly mounted on the motor housing and including at least one transmission component driven by the electric motor, wherein the nosecone assembly includes a metal body;
   a terminal block disposed at a foot of the handle and configured to be coupled to a removable battery pack, wherein the terminal block includes at least a power terminal configured to mate with a corresponding power terminal of the battery pack to receive a supply of electric current;
   an electronic power module configured to regulate the supply of electric current from the battery pack to the motor; and
   a discharge wire coupled to the power terminal of the terminal block on a first end thereof and to a connection tab on a second end thereof, wherein the connection tab extends through a gap between the electric motor and the nosecone assembly and is securely coupled to a rear radial surface of metal body of the nosecone assembly facing the electric motor to provide a discharge path from the nosecone directly to the battery pack bypassing the electronic power module.

2. The power tool of claim 1, wherein the electronic power module includes a module housing having a bottom surface, a circuit board disposed within the module housing parallel to the bottom surface, and plurality of power switches mounted on a circuit board, wherein the discharge wire extends along the module housing.

3. The power tool of claim 2, wherein the electronic power module includes at least one wire holder configured to retain the discharge wire on the bottom surface.

4. The power tool of claim 1, wherein the power terminal of the terminal block includes a negative terminal and a positive terminal, and the discharge wire is coupled to the negative terminal.

5. The power tool of claim 1, wherein the connection tab includes a first portion coupled to the second end of the discharge wire and a second portion coupled to the metal body of the nosecone assembly.

6. The power tool of claim 5, wherein the first portion of the connection tab extends substantially along an axis of the motor, and the second portion of the connection tab extends substantially perpendicularly to the first portion.

7. The power tool of claim 5, wherein the metal body of the nosecone assembly includes a threaded hole formed in the rear radial surface thereof, and wherein the second portion of the connection tab is configured to be received within the gap between the electric motor and the nosecone assembly and is secured to a radial portion of the metal body of the nosecone assembly via a fastener fastened into the threaded hole.

8. The power tool of claim 5, wherein the second portion of the connection tab is provided with a planar body having a non-circular outer periphery and a through-hole, wherein the metal body of the nosecone assembly includes a recessed portion shaped to non-rotatably receive the planar body of the second portion of the connection tab and having a threaded opening therein, and wherein a fastener is received through the through-hole and fastened into the threaded opening.

9. A power tool comprising:
a housing including a motor housing and a handle;
an electric motor disposed inside the motor housing;
a nosecone assembly mounted on the motor housing and including at least one transmission component driven by the electric motor, wherein the nosecone assembly includes a metal body having a protrusion formed on an outer surface of the metal body;
a terminal block disposed at a foot of the handle and configured to be coupled to a removable battery pack, wherein the terminal block includes at least a power terminal configured to mate with a corresponding power terminal of the battery pack to receive a supply of electric current;
an electronic power module configured to regulate the supply of electric current from the battery pack to the motor; and
a discharge wire electrically coupled to the power terminal of the terminal block on a first end thereof and electrically coupled to the protrusion of the metal body of the nosecone assembly on a second end thereof to provide a discharge path from the nosecone directly to the battery pack bypassing the electronic power module,
wherein the nosecone assembly includes at least one side protrusion extending radially between respective recessed portions, the at least one side protrusion including a radial opening formed through an outer surface thereof and a lateral opening formed through a side surface thereof and intersecting the radial opening, wherein the second end of the discharge wire is received into one of the radial opening or the lateral opening, and a fastener is received through the other of the radial opening or the lateral opening to secure the second end of the discharge wire to the at least one side protrusion of the nosecone assembly.

10. The power tool of claim 9, further comprising a hook terminal including a wire receptacle coupled to the second end of the discharge wire and a hook portion coupled to the protrusion of the metal body of the nosecone assembly, wherein the protrusion includes a main portion having a rectangular cross-section sized to be received within the hook portion of the hook terminal.

11. The power tool of claim 10, wherein the protrusion further includes a lower portion having a larger cross-sectional area than the main portion that engages a lower edge of the hook portion to keep it in engagement with the main portion.

12. The power tool of claim 9, further comprising a ring terminal including a wire receptacle coupled to the second end of the discharge wire and a loop portion configured to receive a fastener therein for coupling a corresponding threaded opening formed in the metal body of the nosecone assembly.

13. A power tool comprising:
a housing;
an electric motor disposed within the housing;
a nosecone assembly mounted on the housing and including at least one transmission component driven by the electric motor, wherein the nosecone assembly includes a metal body having at least one side protrusion extending radially between respective recessed portions, the at least one side protrusion including a radial opening formed through an outer surface thereof and a lateral opening formed through a side surface thereof and intersecting the radial opening;
a terminal block configured to be coupled to a removable battery pack, wherein the terminal block includes at least a power terminal configured to mate with a corresponding power terminal of the battery pack to receive a supply of electric current;
an electronic power module configured to regulate the supply of electric current from the battery pack to the motor; and
a discharge wire coupled to the power terminal of the terminal block on a first end thereof and to the metal body of the nosecone assembly on a second end thereof to provide a discharge path from the nosecone directly to the battery pack bypassing the electronic power module, wherein the second end of the discharge wire is received into one of the radial opening or the lateral opening, and a fastener is received through the other of the radial opening or the lateral opening to secure the second end of the discharge wire to the at least one side protrusion of the nosecone assembly.

14. The power tool of claim 13, wherein the second end of the discharge wire is received into the radial opening and the fastener is received through the lateral opening.

* * * * *